United States Patent
Sun et al.

(10) Patent No.: US 11,456,676 B2
(45) Date of Patent: Sep. 27, 2022

(54) POWER CONVERSION CIRCUIT AND METHOD THEREOF

(71) Applicant: Shanghai Bright Power Semiconductor Co., Ltd., Shanghai (CN)

(72) Inventors: Shun-Gen Sun, Shanghai (CN); Wei-Jia Yu, Shanghai (CN); Sheng-Hong Wu, Shanghai (CN)

(73) Assignee: SHANGHAI BRIGHT POWER SEMICONDUCTOR CO., LTD., Shanghai (CN)

(*) Notice: Subject to any disclaimer, the term of this patent is extended or adjusted under 35 U.S.C. 154(b) by 106 days.

(21) Appl. No.: 17/155,528

(22) Filed: Jan. 22, 2021

(65) Prior Publication Data
US 2021/0226554 A1    Jul. 22, 2021

(30) Foreign Application Priority Data
Jan. 22, 2020  (CN) .......................... 202010075568.5

(51) Int. Cl.
| *H02M 3/335* | (2006.01) |
| *H02M 7/217* | (2006.01) |
| *H02M 1/08* | (2006.01) |
| *H02M 1/00* | (2006.01) |

(52) U.S. Cl.
CPC ........... *H02M 7/217* (2013.01); *H02M 1/083* (2013.01); *H02M 1/0032* (2021.05); *H02M 3/33507* (2013.01); *H02M 3/33569* (2013.01); *H02M 3/33592* (2013.01)

(58) Field of Classification Search
CPC ......... H02M 3/33507; H02M 3/33569; H02M 3/33592; H02M 7/217; H02J 3/383
See application file for complete search history.

(56) References Cited

U.S. PATENT DOCUMENTS

| 7,375,994 B2 | 5/2008 | Andreycak |
| 7,710,748 B2 | 5/2010 | Young |
| 7,990,127 B2 | 8/2011 | Saint-Pierre |
| 9,590,526 B2* | 3/2017 | Adest ...................... H02J 3/385 |
| 2018/0366945 A1* | 12/2018 | Braginsky ................ H02H 7/20 |
| 2018/0376553 A1* | 12/2018 | Chen ..................... H02M 3/156 |

FOREIGN PATENT DOCUMENTS

CN            209448724 U        9/2019

\* cited by examiner

*Primary Examiner* — Gary A Nash
(74) *Attorney, Agent, or Firm* — Muncy, Geissler, Olds & Lowe, P.C.

(57) ABSTRACT

A power conversion circuit and a method thereof, wherein the power conversion circuit includes a first grid interface and a second grid interface coupled to an AC power source, a power harvesting module, a sampling module and a switching module. The power harvesting module is coupled to the first grid interface, and the power harvesting module includes a first diode and a first charging capacitor coupled to the first diode. The power harvesting module receives the AC power source from the first grid interface to generate an output voltage. The switching module includes a switch component controlled by the sampling module. The sampling module is coupled to the power harvesting module and acquires a sampling voltage. The sampling module controls the switch component to be turned off during at least a period of time within positive half cycles of the AC power source.

14 Claims, 7 Drawing Sheets

POWER CONVERSION CIRCUIT AND METHOD THEREOF

FIELD OF THE INVENTION

The present invention relates to a power conversion circuit and a method thereof, and particularly to a power conversion circuit for a control panel and a method thereof

BACKGROUND OF THE INVENTION

An in-wall switch, which is also called a control panel, is extensively applied in various fields and devices. With development of the electrical appliances and the trend of smart homes, conventional control panels are gradually substituted by smart control panels.

Taking a smart control panel for instance, smart modules are arranged in the panel to provide various functions. An alternating current of grid is converted to a direct current to supply power for the smart modules. For example, the conventional power conversion circuits are mentioned in the U.S. Pat. Nos. 7,375,994, 7,710,748 and 7,990,127.

The conventional power conversion circuits are widely applied in commercial products, still some power conversion circuits have complicated structures and large power consumption during standby operation. Therefore, the conventional power conversion circuits need to be improved.

SUMMARY OF THE INVENTION

It is a primary object of the present invention to overcome the issues of complicated structures and large power consumption during standby operation for a power conversion circuit.

To achieve the object, the present invention provides a power conversion circuit. The power conversion circuit includes a first grid interface and a second grid interface, coupled to an AC power source; a power harvesting module, coupled to the first grid interface, the power harvesting module comprising a first diode and a first charging capacitor coupled to the first diode, the power harvesting module receiving the AC power source from the first grid interface to generate an output voltage; a switching module, coupled to the first grid interface, the switching module comprising a switch component; and a sampling module, coupled to the first grid interface to acquire a sampling voltage and control the switch component to be turned off during at least a period of time within positive half cycles of the AC power source.

In one or more embodiments, the first grid interface is coupled to a neutral wire of the AC power source, and the second grid interface is coupled to a live wire of the AC power source.

In one or more embodiments, the sampling module further comprises a first comparison unit, the first comparison unit comparing the sampling voltage with a first reference voltage to generate a first comparison signal.

In one or more embodiments, the sampling module comprises a first logic unit coupled to the first comparison unit, the first logic unit receiving the first comparison signal and generating a control signal to control the switching module.

In one or more embodiments, the sampling module further comprises a second comparison unit, the second comparison unit comparing the sampling voltage with a second reference voltage to generate a zero-crossing detection signal of the sampling voltage.

In one or more embodiments, the first reference voltage is at a higher level than the second reference voltage.

In one or more embodiments, the switch component is turned on for a longer time in one negative half cycle of the power source than in another negative half cycle of the power source.

In one or more embodiments, the power conversion circuit further comprises a reset module coupled to the output voltage, the reset module comparing a voltage representing the output voltage and a third reference voltage to generate a reset signal, the reset signal indicating the switch component to turn off when the output voltage is lower than a threshold.

To achieve the object above, the present invention further provides a power conversion control method applied to a power conversion circuit. The power conversion circuit includes a power harvesting module and a switching module, the power harvesting module receiving an AC power source to generate an output voltage, the switching module being coupled to the power harvesting module and comprising a switch component, wherein the power conversion control method comprises:

acquiring a sampling voltage from the connection point between the switching module and the power harvesting module;

comparing the sampling voltage with a first reference voltage and generating a first comparison signal; and controlling the switch component to be turned off during at least a period of time within positive half cycles of the AC power source.

In one or more embodiments, the switch component is turned on for a longer time in one negative half cycle of the AC power source than in another negative half cycle of the AC power source.

In one or more embodiments, the power conversion control method further includes a step of comparing the sampling voltage with a second reference voltage to generate a zero-crossing detection signal of the sampling voltage.

In one or more embodiments, the power conversion control method further includes a step of calculating an expected conduction time of the switch component based on the zero-crossing detection signal and the first comparison signal.

In one or more embodiments, the power conversion control method further includes a step of comparing a voltage representing the output voltage and a third reference voltage to generate a reset signal, the reset signal indicating the switch component to turn off when the output voltage is lower than a threshold.

In the present invention, the switch component is controlled to be turned off during at least one period of time within a positive half cycle of the alternating current, to provide power to the power harvesting module. In addition, the switch component is turned on during one negative half cycle of the alternating current for a longer period of time than during another negative half cycle of the alternating current. Thus, the conduction time of the free-wheeling component during the negative half cycle of the alternating current is reduced, so that the conduction loss of the free-wheeling component is reduced.

DETAILED DESCRIPTION OF THE PREFERRED EMBODIMENTS

Details and technical contents of the present invention are given with the accompanying drawings below. For the present invention, coupling of two or more components refers to a direct electrical connection formed directly or indirectly between two or more components.

Figure 1:
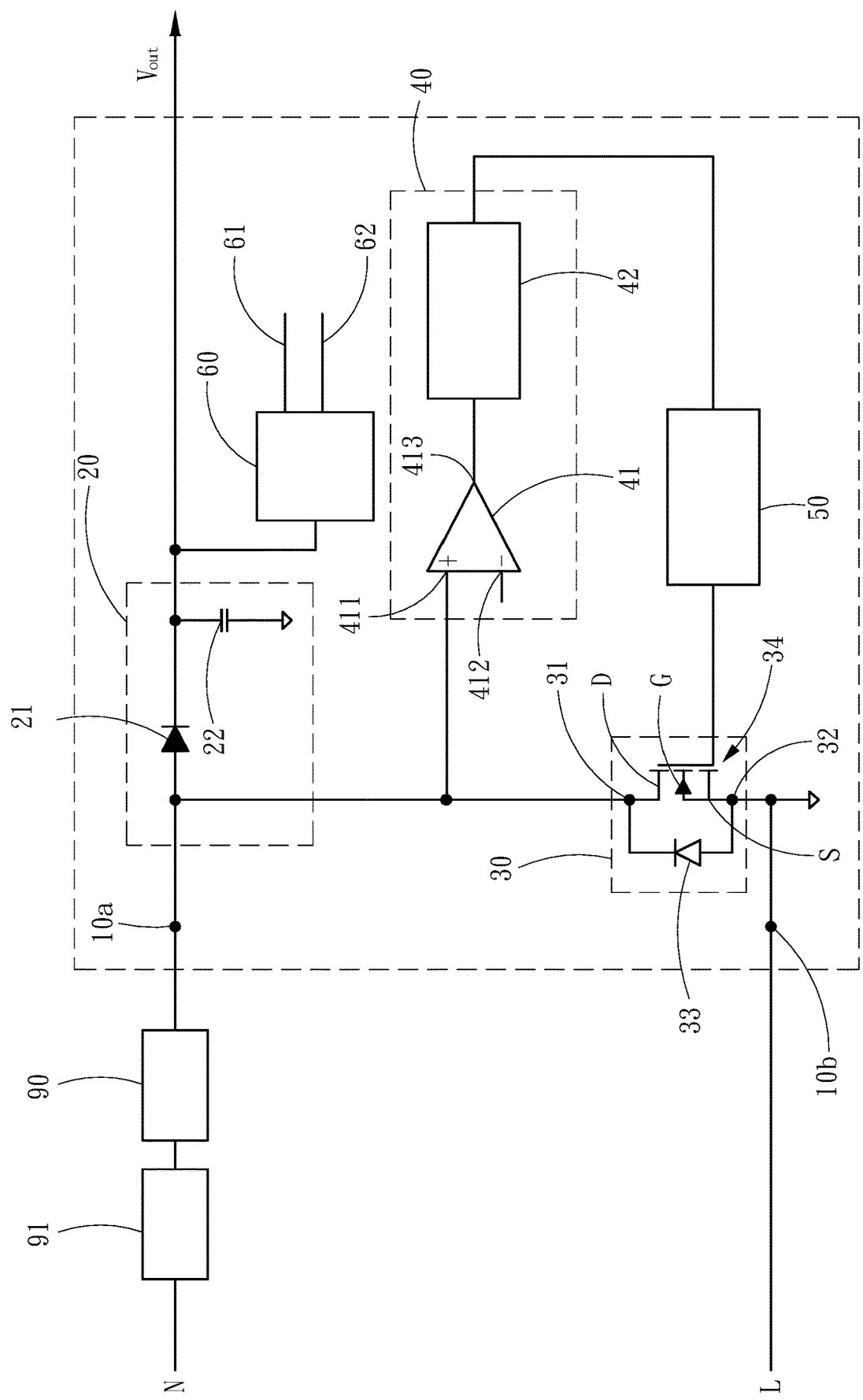
FIG. 1 is a schematic diagram of a circuit structure according to an embodiment of the present invention.

Refer to FIG. 1 showing a schematic diagram of a circuit diagram of a power conversion circuit provided according to an embodiment of the present invention. The power conversion circuit is applied in a control panel. The power conversion circuit is connected to an alternating current via a power relay 90 and a load 91 connected in series. The power conversion circuit comprises a first grid interface 10a, a second grid interface 10b, a power harvesting module 20, a switching module 30, a sampling module 40 and a driver module 50. In this embodiment, the power conversion circuit further includes a linear regulator 60. In an embodiment shown in FIG. 1, the control panel is connected with a single live wire, more specifically, the first grid interface 10a is electrically connected to a neutral wire N of the alternating current, and the second grid interface 10b is electrically connected to a live wire L of the alternating current. In another embodiment, a control panel connected with a single live wire can be adopted as the first grid interface 10a electrically connected to the live wire L of the alternating current, and the second grid interface 10b electrically connected to the neutral wire N of the alternating current.

In this embodiment, the power harvesting module 20 includes a first diode 21 and a first charging capacitor 22. The power harvesting module 20 receives the alternating current to output a voltage $V_{out}$. The switching module 30 includes a first terminal 31, a second terminal 32, a free-wheeling component 33 and a switch component 34. The switch component 34 is a power switch, for example, a metal-oxide-semiconductor field-effect transistor (MOSFET), and the free-wheeling component 33 is a diode, for example, a body diode of the switch component 34. The switch component 34 and the free-wheeling component 33 are connected in parallel via the first terminal 31 and the second terminal 32. More specifically, the switch component 34 includes a drain terminal D, a source terminal S and a gate terminal G. The drain terminal D and the source terminal S are respectively coupled to the first terminal 31 and the second terminal 32, meanwhile the gate terminal G is coupled to the driver module 50.

In an embodiment, the sampling module 40 includes a first comparator 41 and a first logic unit 42. The first comparator 41 includes a first input terminal 411, a second input terminal 412 and an output terminal 413. The first input terminal 411 is coupled to a connection point between the power harvesting module 20 and the switching module 30, for example the connection point being the first grid interface 10a, to acquire a sampling voltage. The second input terminal 412 receives a first reference voltage. The first comparator 41 compares the sampling voltage with the first reference voltage and sends a first comparison signal to the first logic unit 42. The first logic unit 42 generates a control signal $V_{Gate}$ to the driver module 50 to control the switching module 30. The linear regulator 60 includes a first output 61 and a second output 62. The second output 62 supplies power needed by the modules mentioned above, while the second output 62 provides the first reference voltage.

Figure 2:
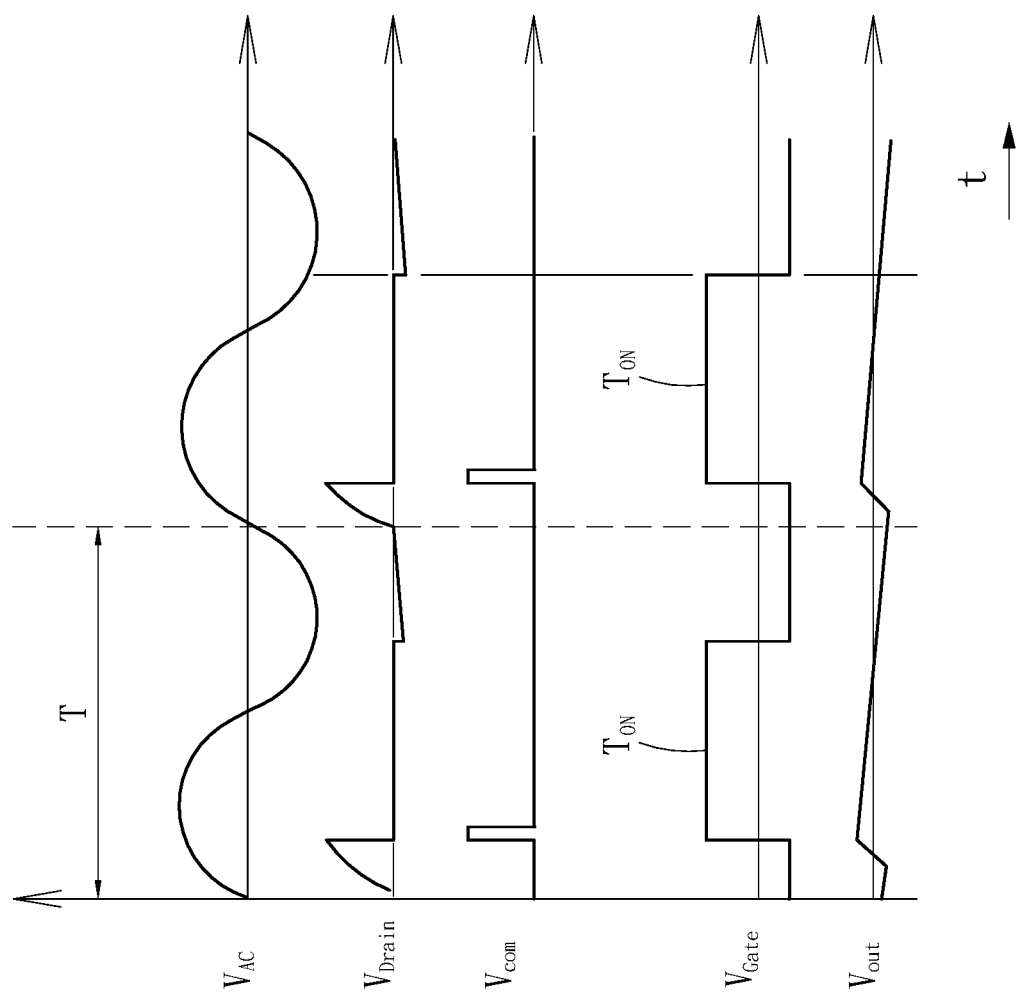
FIG. 2 is a schematic diagram of voltage waveforms during operation of the embodiment in FIG. 1.

Referring to FIG. 2 showing a schematic diagram of voltage waveforms during operation of the circuit in FIG. 1, $V_{AC}$ is the AC voltage of the alternating current, $V_{Drain}$ is the voltage at the drain terminal D of the switch component 34, $V_{com}$ is the voltage outputted from the first comparator 41, $V_{Gate}$ is the control signal at the gate terminal G of the switch component 34, $V_{out}$ is the output voltage $V_{out}$ of the power harvesting module 20, and T represents the alternating-current cycle (AC cycle). In one embodiment, the driver module 50 controls the switch component 34 to be turned on during a period of time within a positive half cycle of the alternating current, that is, to be turned off during at least a period of time within several positive half cycles of the alternating current.

In FIG. 2, it is shown that $V_{AC}$ gradually increases from a valley value. When $V_{AC}$ is relatively low, $V_{Gate}$ is a low potential, and the switch component 34 is turned off. As the alternating current gradually increases, the voltage $V_{Drain}$ rises higher than a conduction voltage of the first diode 21, so that the first charging capacitor 22 starts to be charged and the output voltage $V_{out}$ increases. Once $V_{Drain}$ exceeds a threshold (that is, the sampling voltage is more than the first reference voltage), the first comparison signal $V_{com}$ changes to a high potential, the first logic unit 42 then immediately controls the driver module 50 to turn on the switch component 34. When the switch component 34 is turned on, the current of the load 91 flows through the switch component 34. At this time, $V_{Drain}$ decreases to a low potential, and the free-wheeling component 33 (the diode) is reverse biased and in a cut-off state, so as to prevent the voltage $V_{out}$ of the charging capacitor 22 from discharging by the drain terminal D.

In one embodiment, the first logic unit 42 adopts a timer which receives the first comparison result from the first comparator 41. The timer determines the period of time during which the switch component 34 is turned on by the driver module 50, that is, the on-time $T_{ON}$. More specifically, when the first comparison result is at high level, the switch component 34 is turned on and the timer starts. When a preset period of time ($T_{ON}$) is passed, the first logic unit 42 controls the driver module 50 to turn off the switch component 34. In the present invention, the on-time $T_{ON}$ of the switch component 34 is controlled to be longer than one half of the AC cycle and shorter than one whole AC cycle, that is, $T_{ON}$ is between ½T and T. When the alternating current is in a negative half cycle and the switch component 34 is turned off, the current of the load 91 flows through the free-wheeling component 33 (the diode). Thus, the current flows from the drain terminal D to the source terminal S.

In another embodiment, for the switch component 34, the portion of on-time $T_{ON}$ within a negative half cycle of $V_{AC}$ is longer than the portion of on-time $T_{ON}$ within another negative half cycle of $V_{AC}$, so as to reduce the conduction time of the free-wheeling component 33. In some embodiments, the on-time $T_{ON}$ of the switch component 34 within present negative half cycle of $V_{AC}$ is longer than the on-time $T_{ON}$ of the switch component 34 within the former negative half cycle of $V_{AC}$.

Figure 3:
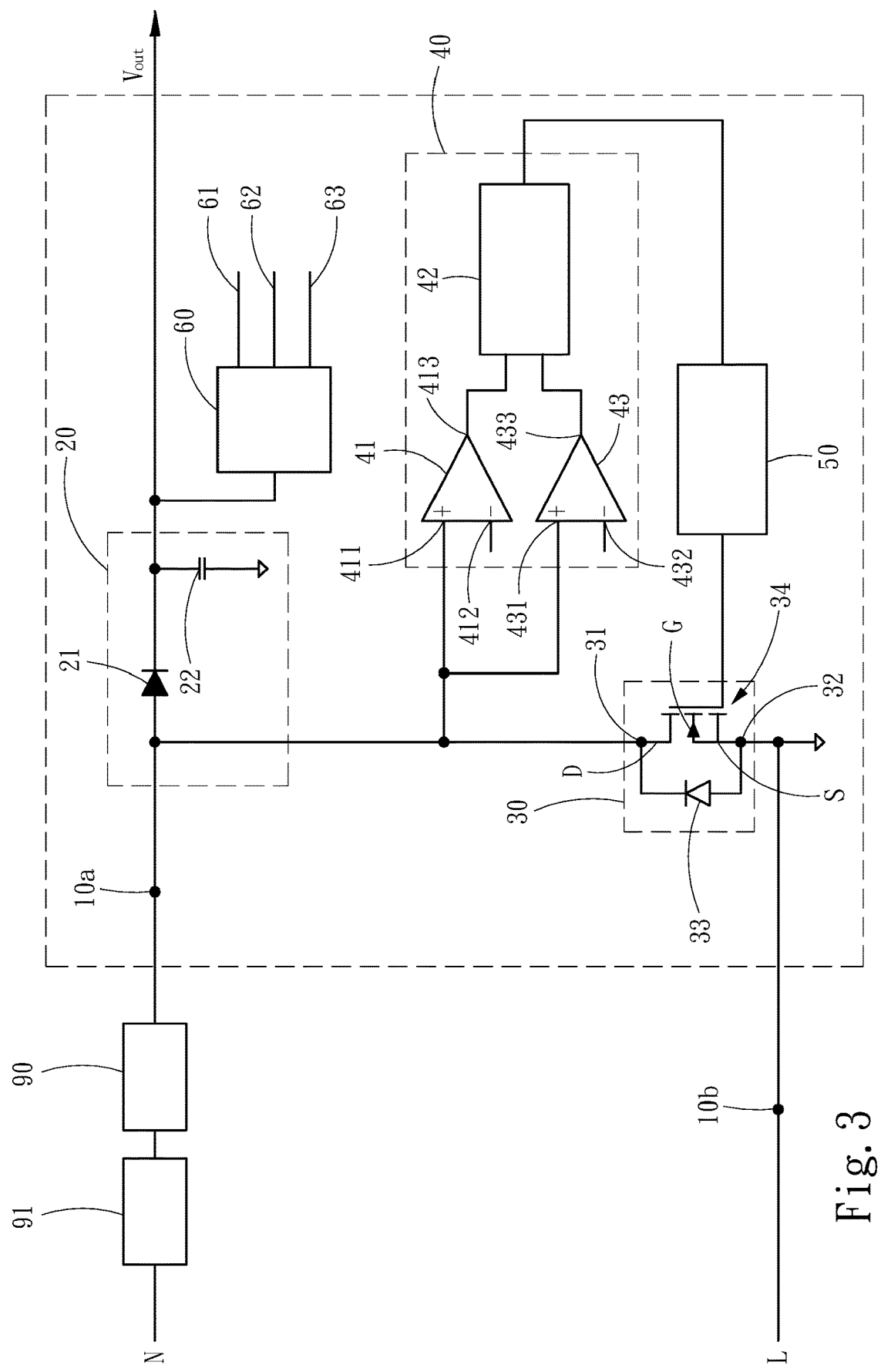
FIG. 3 is a schematic diagram of a circuit structure according to another embodiment of the present invention.
Figure 4:
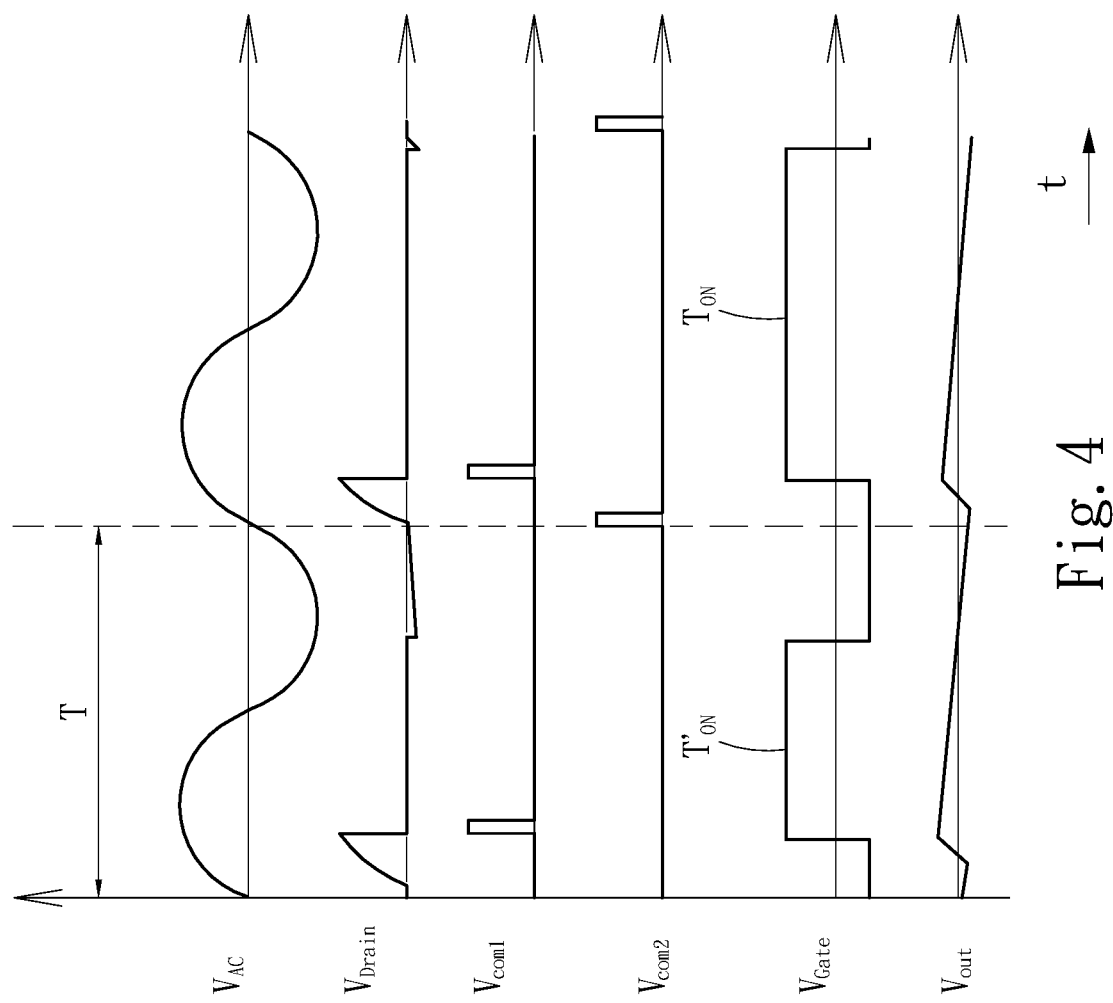
FIG. 4 is a schematic diagram of voltage waveforms during operation of the embodiment in FIG. 3.

Please refer to FIG. 3 and FIG. 4 for another embodiment of the invention. FIG. 3 is a schematic diagram of a circuit structure, and FIG. 4 is a schematic diagram of a voltage waveforms during operation of the circuit in FIG. 3. Compared to the embodiment in FIG. 1, the comparison unit further includes a second comparator 43. The second comparator 43 includes a first input terminal 431, a second input terminal 432, and an output terminal 433. The first input terminal 431 is coupled to a connection point between the power harvesting module 20 and the switching module 30, for example the connection point being the first grid interface 10a, to acquire a sampling voltage. The second input terminal 432 receives a second reference voltage, which is provided by a third output 63 of the linear regulator 60. The second comparator 43 performs zero-crossing detection by comparing the sampling voltage with the second reference voltage to confirm whether $V_{AC}$ is crossing zero value. In other words, the second comparator 43 compares the sampling voltage with the second reference voltage, and outputs a $V_{AC}$ zero detection signal. In this embodiment, the first reference voltage is at a higher level than the second reference voltage. In FIG. 4, $V_{com1}$ is the voltage outputted from the first comparator 41, and $V_{com2}$ is the voltage outputted from the second comparator 43.

The first logic unit 42 calculates a time difference $T_d$ between the pulses of $V_{com1}$ and $V_{com2}$ in the previous AC cycle. In FIG. 4, $T'_{ON}$ is the on-time in the previous AC cycle, and $T_{ON}$ is the on-time in the present AC cycle, where $T_{ON}=T_d$. In other embodiments, the on-time in the present AC cycle $T_{ON}=T_d-\Delta T$, where $\Delta T$ is a predetermined time. In a preferred embodiment, after start-up of the power conversion circuit, the on-time of the switch component 34 in the first AC cycle is a smallest value, and then the on-time of the switch component 34 in subsequent AC cycles is adjusted according to time difference $T_d$ in the previous AC cycle. Thus, the time interval of the current flowing through the free-wheeling component 33 is reduced by increasing the on-time of the switch component 34. Taking the free-wheeling component 33 implemented as a body diode as an example, in the negative half cycle of the AC cycle, the conduction loss of the body diode is equal to a product of the current flowing through the diode and the voltage difference between the drain terminal and the source terminal Thus, if the current flows through the free-wheeling component 33 for a shorter time, the conduction loss of the body diode is effectively reduced.

Figure 5:
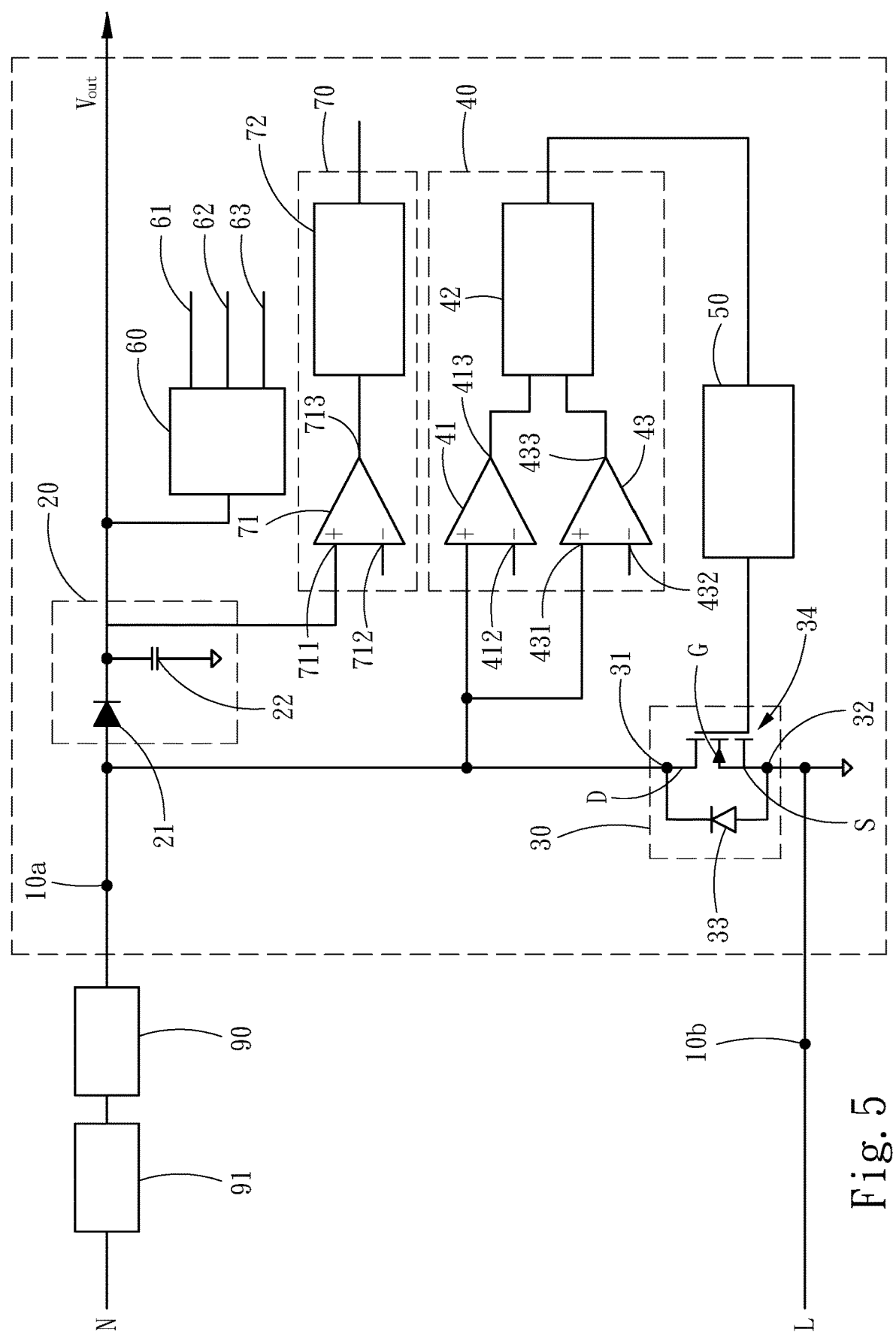
FIG. 5 is a schematic diagram of a circuit structure according to another embodiment of the present invention.
Figure 6:
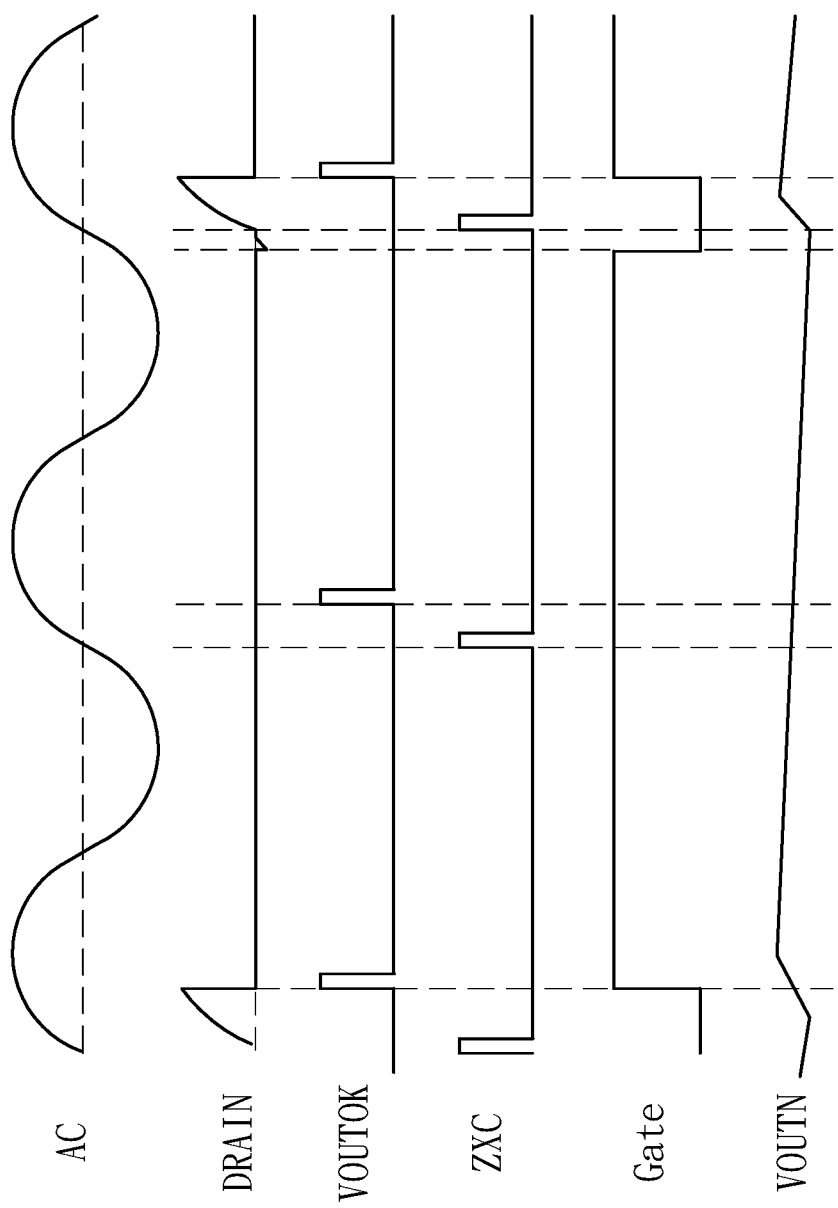
FIG. 6 is a schematic diagram of voltage waveforms during operation of the embodiment in FIG. 5.

Refer to FIG. 5 showing a schematic diagram of a circuit structure according to another embodiment. In this embodiment, a reset module 70 is additionally provided. The reset module 70 includes a third comparator 71 coupled to the output voltage $V_{out}$, and the reset module 70 also includes a second logic unit 72 coupled to the third comparator 71. The third comparator 71 includes a first input terminal 711, a second input terminal 712 and an output terminal 713. The first input terminal 711 detects the output voltage, and the second input terminal 712 receives a third reference voltage. The second logic unit 72 performs a timing operation once the output voltage reaches the third reference voltage, and then outputs a reset signal after a predetermined time is passed. The reset signal indicates the switch component 34 to be turned off Referring to FIG. 6 showing a schematic diagram of voltage waveforms during operation of the embodiment in FIG. 5, the switch component 34 in FIG. 5 is turned off every two AC cycles.

Figure 7:
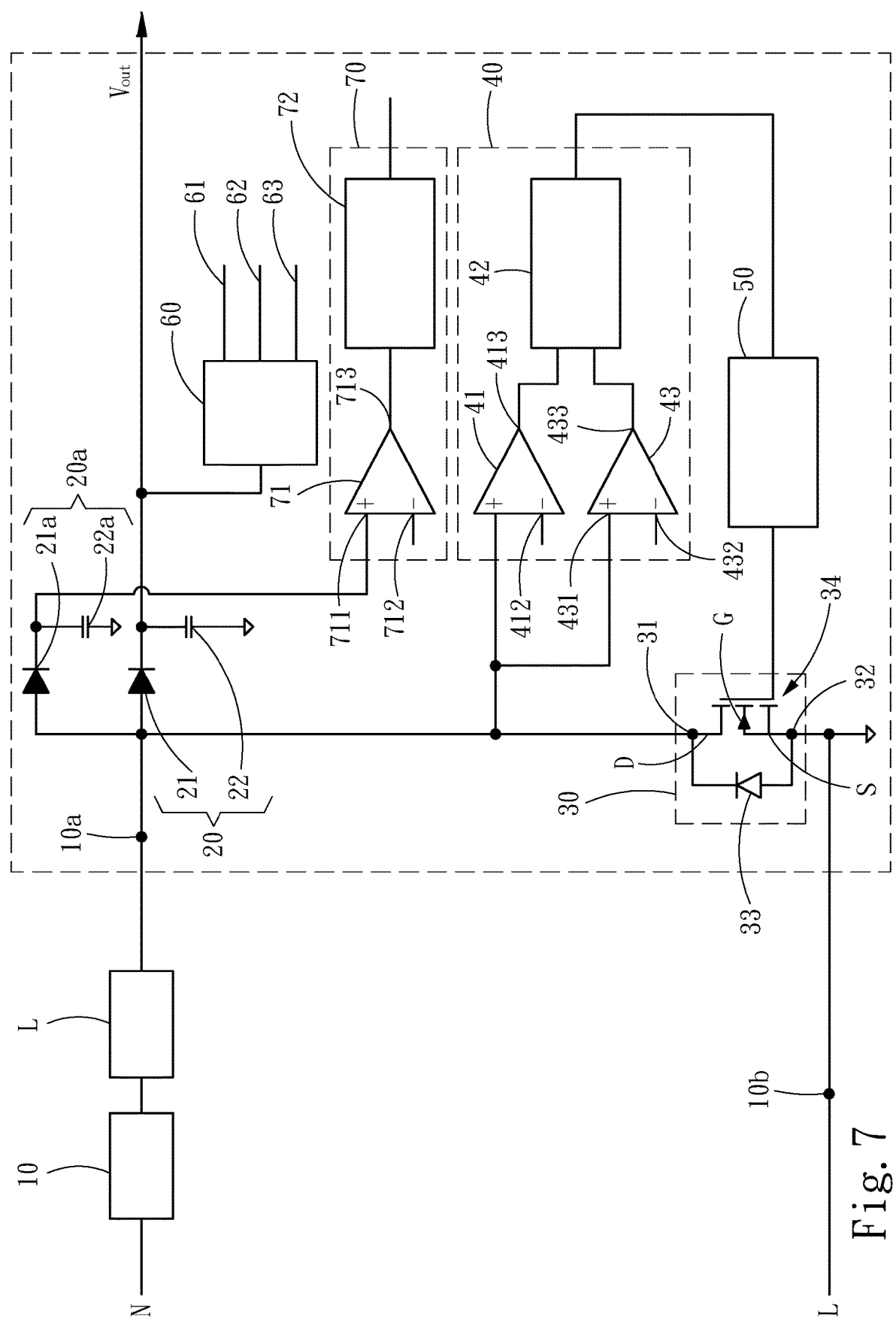
FIG. 7 is a schematic diagram of a circuit structure according to another embodiment of the present invention.

Refer to FIG. 7 showing a schematic diagram of a circuit structure according to another embodiment. In this embodiment, in addition to the reset module 70, a second power harvesting module 20a is further provided. The second power harvesting module 20a includes a second diode 21a, and a second charging capacitor 22a coupled to the second diode 21a. The second power harvesting module 20a receives the alternating current, and generates the third reference voltage to the first input terminal 711 of the third comparator 71. In this embodiment, the detection of the output voltage is bypassed from the power supply line of the output voltage, thus improving the stability of power supplied by the output voltage.

The present invention further provides a control method applied to a power conversion circuit. The arrangement of the power conversion circuit is referred from the numerals and drawings described above. The method includes the following steps.

In step 1, a sampling voltage is acquired from the connection point between the switching module 30 and the power harvesting module 20.

In step 2, the sampling voltage is compared with a first reference voltage, and then a first comparison signal is outputted.

In step 3, the driver module 50 receives the comparison signal, and controls the switch component 34 to be turned off during at least a period of time within positive half cycles of the AC power source.

According to an embodiment of the present invention, the switch component 34 is turned on for a longer time in one negative half cycle of the AC cycle than in another negative half cycle of the AC cycle, so as to reduce the conduction loss of the free-wheeling component 33 in the negative half cycle. According to an embodiment, the on-time of the switch component 34 in the negative half cycle of the current AC cycle is longer than the on-time of the switch component 34 in the negative half cycle of the previous AC cycle.

In the control method, zero-crossing detection is further performed by comparing the sampling voltage with a second reference voltage to detect the time point when the sampling voltage decreases to zero. In other words, the second comparator 43 compares the sampling voltage with the second reference voltage to output a zero detection signal of the sampling voltage. Thus, the time interval of the current flowing through the free-wheeling component 33 is reduced by increasing the on-time of the switch component 34. The conduction loss of the body diode is effectively reduced.

What is claimed is:

1. A power conversion circuit, comprising:
   a first grid interface and a second grid interface, coupled to an AC power source;
   a power harvesting module, coupled to the first grid interface, the power harvesting module comprising a first diode and a first charging capacitor coupled to the first diode, the power harvesting module receiving the AC power source from the first grid interface to generate an output voltage;
   a switching module, coupled to the first grid interface, the switching module comprising a switch component; and
   a sampling module, coupled to the first grid interface to acquire a sampling voltage and control the switch component to be turned off during at least a period of time within positive half cycles of the AC power source.

2. The power conversion circuit as claimed in claim 1, wherein the first grid interface is coupled to a neutral wire of the AC power source, and the second grid interface is coupled to a live wire of the AC power source.

3. The power conversion circuit as claimed in claim 1, wherein the sampling module further comprises a first comparison unit, the first comparison unit comparing the sampling voltage with a first reference voltage to generate a first comparison signal.

4. The power conversion circuit as claimed in claim 3, wherein the sampling module comprises a first logic unit coupled to the first comparison unit, the first logic unit receiving the first comparison signal and generating a control signal to control the switching module.

5. The power conversion circuit as claimed in claim 3, wherein the sampling module further comprises a second comparison unit, the second comparison unit comparing the sampling voltage with a second reference voltage to generate a zero-crossing detection signal of the sampling voltage.

6. The power conversion circuit as claimed in claim 5, wherein the first reference voltage is at a higher level than the second reference voltage.

7. The power conversion circuit as claimed in claim 1, wherein the switch component is turned on for a longer time in one negative half cycle of the AC power source than in another negative half cycle of the AC power source.

8. The power conversion circuit as claimed in claim 1, wherein the power conversion circuit further comprises a reset module coupled to the output voltage, the reset module comparing a voltage representing the output voltage and a third reference voltage to generate a reset signal, the reset signal indicating the switch component to turn off when the output voltage is lower than a threshold.

9. A control method applied to a power conversion circuit, the power conversion circuit comprising a power harvesting module and a switching module, the power harvesting module receiving an AC power source to generate an output voltage, the switching module being coupled to the power harvesting module and comprising a switch component, wherein the power conversion control method comprises:

acquiring a sampling voltage from the connection point between the switching module and the power harvesting module;

comparing the sampling voltage with a first reference voltage and generating a first comparison signal; and controlling the switch component to be turned off during at least a period of time within positive half cycles of the AC power source.

10. The control method as claimed in claim 9, wherein the switch component is turned on for a longer time in one negative half cycle of the AC power source than in another negative half cycle of the AC power source.

11. The control method as claimed in claim 9, further comprising:

comparing the sampling voltage with a second reference voltage to generate a zero-crossing detection signal of the sampling voltage.

12. The control method as claimed in claim 11, wherein the first reference voltage is at a higher level than the second reference voltage.

13. The control method as claimed in claim 11, further comprising:

calculating an expected conduction time of the switch component based on the zero-crossing detection signal and the first comparison signal.

14. The control method as claimed in claim 9, further comprising:

comparing a voltage representing the output voltage and a third reference voltage to generate a reset signal, the reset signal indicating the switch component to turn off when the output voltage is lower than a threshold.

* * * * *